United States Patent [19]

Kawakami et al.

[11] Patent Number: 4,931,912

[45] Date of Patent: Jun. 5, 1990

[54] SQUARE HEADLAMP FOR AUTOMOBILE

[75] Inventors: Tamaki Kawakami; Masayasu Endo; Toshiyuki Katsumata, all of Shizuoka, Japan

[73] Assignee: Koito Manufacturing Co., Ltd., Tokyo, Japan

[21] Appl. No.: 331,324

[22] Filed: Mar. 31, 1989

[30] Foreign Application Priority Data

Apr. 18, 1988 [JP] Japan .............................. 63-50960[U]
Apr. 22, 1988 [JP] Japan .............................. 63-53519[U]

[51] Int. Cl.[5] .............................................. B60Q 1/02
[52] U.S. Cl. ...................................... 362/61; 362/294; 362/373
[58] Field of Search .................... 362/61, 80, 294, 373, 362/267, 96, 332

[56] References Cited

U.S. PATENT DOCUMENTS 3,870,876 3/1975 Puyplat .............................. 362/247
3,932,837 1/1976 Baker .................................. 362/419
4,329,738 5/1982 Heinz et al. .......................... 362/328
4,569,007 2/1986 Dick .................................... 362/294
4,695,928 9/1987 Schauwecker et al. ............ 362/267
4,724,515 2/1988 Matsuki et al. ...................... 362/294
4,809,144 2/1989 Szuki .................................... 362/80

*Primary Examiner*—Ira S. Lazarus
*Assistant Examiner*—Sue Hagarman
*Attorney, Agent, or Firm*—Sughrue, Mion, Zinn, Macpeak & Seas

[57] ABSTRACT

A rectangular-type headlamp having improved air circulation in its interior to prevent fogging of the interior surface of the front lens by deposition of water vapor or an oily film. The front lens is provided with a stepped portion along an upper side edge portion projecting from the rear side thereof and lying in an inclined relation with respect to the upper edge. Thermal stress is relieved by forming the side edges of the front lens in a recessed shape in the region where the front lens is mechanically fastened to the lamp body.

5 Claims, 4 Drawing Sheets

SQUARE HEADLAMP FOR AUTOMOBILE

BACKGROUND OF THE INVENTION

The present invention relates to a rectangular-type headlamp for automotive use. More particularly, the invention relates to a rectangular automobile headlamp of the type in which a front lens has a stepped portion at an upper side edge portion so as to accent or emphasize the depth of the headlamp.

Recently, automobile headlamps of a rectangular shape, having a rectangular lamp body and a rectangular front lens, have become the dominant type of headlamps and have displaced round headlamps due to their improved appearance and for other reasons.

The present applicant has previously proposed to form a stepped portion at an upper side edge portion of a front lens a of a rectangular headlamp in order to accent the depth of the headlamp to thereby achieve a further novel appearance.

In automobile headlamps, however, in order to prevent fogging caused, for example, by condensation of water vapor on the inner surface of the lens or deposition on the inner surface of the lens of an oily film resulting from outgassing from hot rubber parts, air passages are provided in the lamp body for communicating the interior of the headlamp with the exterior atmosphere so as to cause a natural convection in the headlamp utilizing the heat generated by the associated bulb, thereby to ventilate the interior of the headlamp.

The new concept of providing a stepped portion at the front lens has resulted in another problem that the natural convection in the headlamp is adversely affected thereby, resulting in a lowered ventilation efficiency. More specifically, as shown in FIG. 10, when a stepped portion 3 of a s uniform width is formed on the upper side edge portion of the front lens 2 along the edge thereof, an stagnant-air region 4 develops in the vicinity of a convex portion 3*a* on the inner surface of the lens. As a result, there has been encountered a problem that this stagnant region prevents a smooth natural convection flow, thus lowering the anti-fogging effect.

Reference numeral 6 in FIG. 10 denotes the lamp body.

SUMMARY OF THE INVENTION

The present invention has been made in view of the above problems, and an object of the invention is to provide a rectangular automobile headlamp which has a stepped portion on a front lens and yet does not have a lowered anti-fogging efficiency of the inner surface of the front lens.

This object has been achieved by a rectangular headlamp for an automobile wherein a rectangular front lens is attached to a rectangular open front of a lamp body, the lamp body has air passage means for communicating the interior of the headlamp with the exterior thereof, and a stepped portion is formed at an upper side edge portion of the front lens and projects from the rear side of the front lens, the stepped portion extending along the upper edge of the front lens in an inclined relation to the upper edge.

The stepped portion, formed at the upper side edge portion of the front lens and extending along the upper edge thereof in inclined relation thereto, provides for a novel appearance.

The stepped portion projects from the rear side of the front lens and extends in an inclined relation to the upper edge of the front lens. The inclined wall of the inclined stepped portion serves to guide the flow of the air to make the flow of the air within the headlamp more active.

The invention further relates to a rectangular automobile o headlamp having a front lens made of a synthetic resin, and particularly to such a headlamp of the type which is effective in absorbing thermal strain developed in the vicinity of the portion of the front lens mechanically fastened to the lamp body. From the viewpoint of weight reduction, front lenses made of a synthetic resin have been increasingly used in place of those made of glass.

The headlamp of this type has a sealing groove formed in a front peripheral edge of the lamp body defining an open front thereof, and a sealing material is received in the sealing groove. The peripheral or side wall of the front lens is fitted or engaged in the sealing groove in such a manner that the sealing material forms a seal between the peripheral wall of the front lens and the sealing groove. Those portions of the front lens and lamp body engaged with each other are fastened together, for example, by metal clips at suitable regions to ensure a positive connection therebetween.

A front lens made a synthetic resin has a higher coefficient of thermal expansion than one made of glass, and in addition the front lens disposed forwardly of the bulb is heated to a much higher temperature than the lamp body and therefore is subjected to greater thermal shrinkage than the lamp body. However, because the front lens is fastened to the lamp body by mechanical fastening means such as metal clips, it cannot freely expand and contract. As a result, strain (thermal strain) due to temperature changes tends to develop o in the vicinity of the mechanically fastened portion of the front lens, which leads to a risk that the synthetic resin front lens may be deformed because of this thermal strain (thermal stress).

Accordingly, another object of the invention is to provide a rectangular automobile headlamp in which thermal strain developing in the front lens made of a synthetic resin is effectively absorbed.

This object has been achieved by a rectangular headlamp for an automobile wherein a sealing material is received in a sealing groove formed in a rectangular front peripheral edge of the lamp body of the headlamp, a peripheral side wall of a rectangular front lens made of a synthetic resin is engaged in the seal groove, and mechanical fastening means fastens the engaging portion at suitable regions spaced in the direction of extension of the side wall, wherein the side wall of the front lens is formed in a projecting shape in the vicinity of the mechanically fastened portion to provide a projecting portion for absorbing thermal strain, the projecting portion projecting from the rear side of the side wall.

The difference in the amount of thermal expansion between the synthetic resin front lens and the lamp body is absorbed by deformation of the projecting portion of the side wall of the front lens. More specifically, the projecting portion of the side wall of the front lens absorbs the thermal strain developing in the front lens so that the generation of thermal stress causing deformation of the front lens is restrained.

DESCRIPTION OF THE PREFERRED EMBODIMENTS

Preferred embodiments of the present invention will now be described with reference to the drawings.

Figure 1:
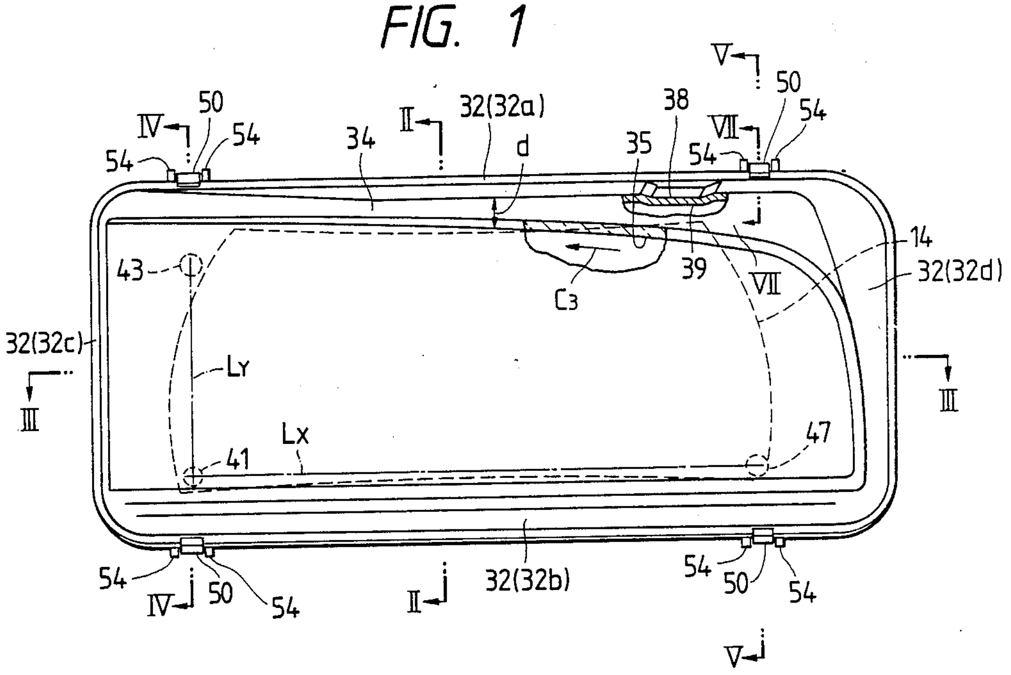
FIG. 1 is a partly broken, front-elevational view of a preferred embodiment of a rectangular automobile headlamp of the present invention.
Figure 2:
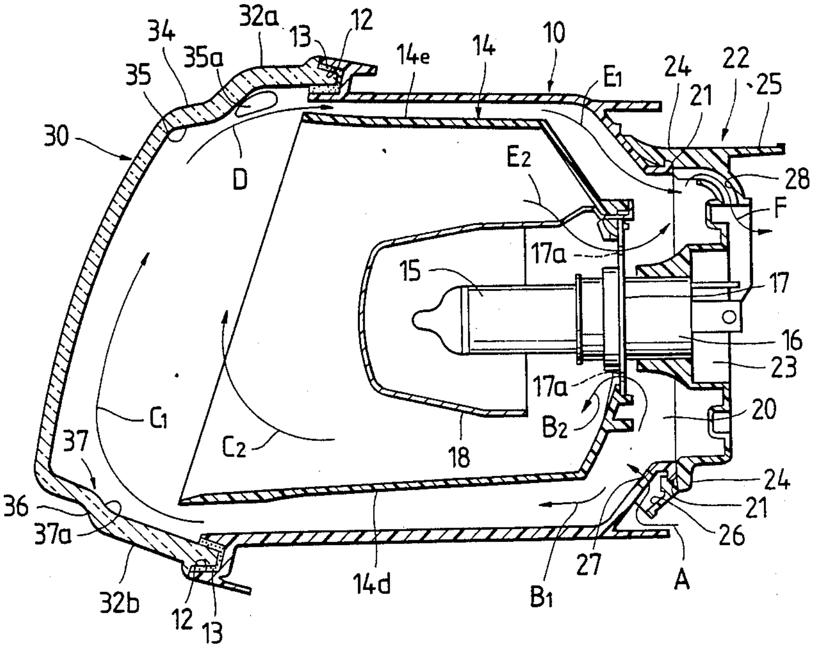
FIG. 2 is a cross-sectional view taken along a line II—II in FIG. 1.
Figure 3:
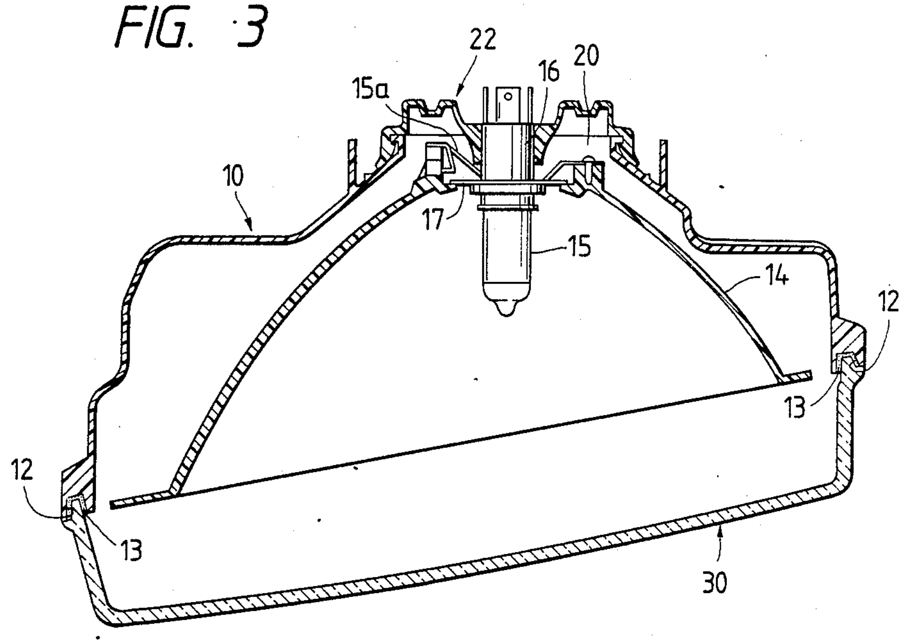
FIG. 3 is a cross-sectional view taken along a line III—III in FIG. 1.
Figure 4:
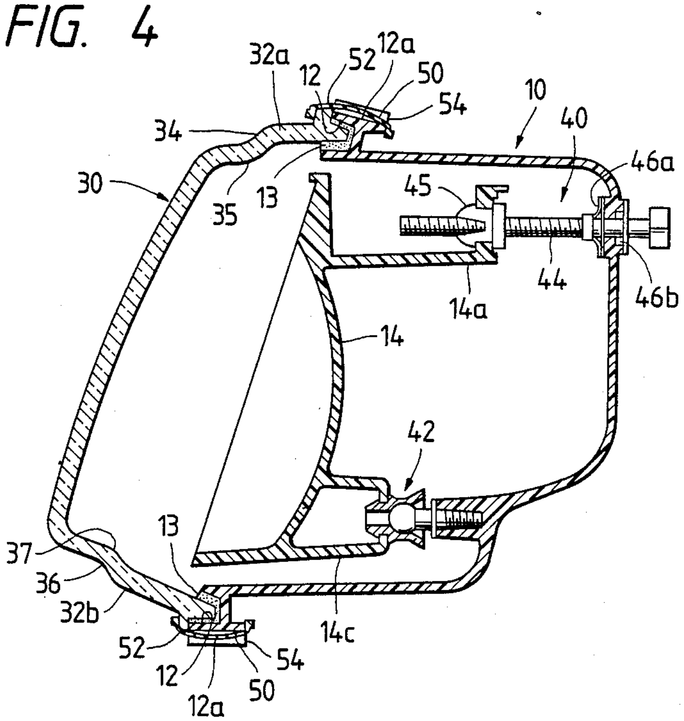
FIG. 4 is a cross-sectional view taken along a line IV—IV in FIG. 1.
Figure 5:
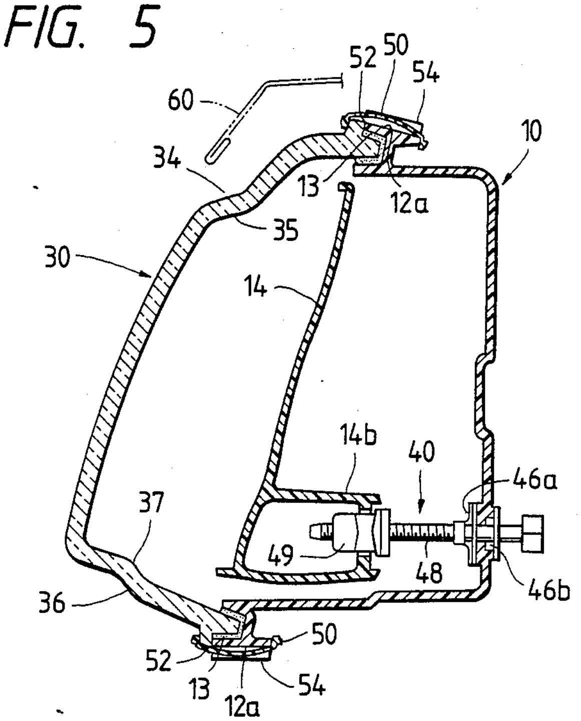
FIG. 5 is a cross-sectional view taken along a line V—V in FIG. 1.
Figure 6:
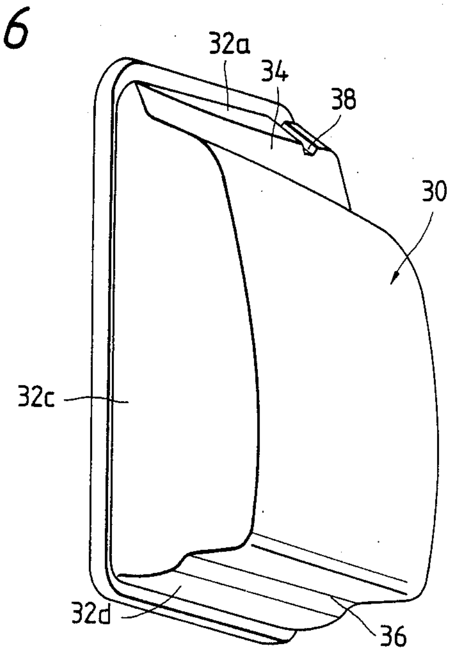
FIG. 6 is a perspective view of a front lens.

FIGS. 1 to 6 show a preferred embodiment of the invention, of which FIG. 1 is a front elevational view of a rectangular headlamp for an automobile, FIG. 2 is a vertical cross-sectional view through a central portion of the headlamp taken along a line II—II in FIG. 1, FIG. 3 is a horizontal cross-sectional view of the headlamp taken along a line III—III in FIG. 1, FIG. 4 is a cross-sectional view taken along a line IV—IV in FIG. 1, FIG. 5 is a cross-sectional view taken along a line V—V in FIG. 1, and FIG. 6 is a perspective view of a front lens.

In these Figures, the headlamp (right-hand side headlamp in this example) includes a front lens 30 integrally attached to an open front of a lamp body 10. The lamp body 10 has a container-like shape and has a seal groove 12 formed in its peripheral edge defining the rectangular front of the lamp body. A sealing material 13 is received in the seal groove 12, and an outer peripheral wall 32 of the front lens 30 defined by wall sections *32a* to *32d* is fitted in the seal groove 12 in such a manner that the sealing material 13 seals the joint between the peripheral wall 32 and the seal groove 12.

A reflector 14 smaller in size than the lamp body 10 is supported within the lamp body 10 by an aiming mechanism 40 shown in FIGS. 4 and 5.

The aiming mechanism 40 functions to vary the direction of the reflector 14 to adjust the angle of radiation (beam angle) of the light. The reflector 14 is supported by a pivot bearing 42 at a point indicated by reference numeral 41 in FIG. 1 and is also supported by position-adjusting rods 44 and 48 at points indicated by reference numerals 43 and 47. The reflector 14 is pivotal about the pivot bearing 42 so that the reflector 14 can be pivotally moved about a horizontal axis Lx by rotating the position-adjusting rod 44 and also about a vertical axis Ly by rotating the position-adjusting rod 48. The direction of the reflector 14 can be adjusted in this manner.

A self-locking nut 45 is threaded on the position-adjusting rod 44 and is fixedly secured to a horizontal arm 14 extending from the rear side of the reflector 14. A nut 49 is screwed on the position-adjusting rod 48 and is fixedly secured to a horizontal arm *14b* extending from the rear side of the reflector 14. In FIGS. 4 and 5, reference numeral *46a* denotes a push-on fixing member, and reference numeral *46b* denotes an O-ring. A horizontal arm *14c* extends from the rear side of the reflector 14 and supports a body of the pivot bearing 42.

A bulb socket 16 integrally connected to a bulb 15 is mounted on a central portion of the reflector 14 by a wire spring *15a* (FIG. 3), and a shade 18 covers the bulb 15. The lamp body 10 has a circular open rear 20 for removably mounting the bulb socket, and a disc-like socket cover 22 is attached to the open rear 20, the socket cover 22 having an inner tubular portion 23 in which the bulb socket 16 is fitted. The socket cover 22 is made of soft rubber and has a skirt-like peripheral edge portion 24 fitted on a flange 21 formed on the rear peripheral edge of the lamp body 10 defining the circular open rear 20 to close the open rear 20.

As shown in FIG. 2, the socket cover 22 has air passages 26 and 28, and the lamp body 10 has an air inlet port 27 formed at the rear side thereof in opposed relation to the air passage 26. The socket cover 22 has a finger grip 25. The socket cover 22 can be easily removed from the lamp body 10 by s gripping and pulling the finger grip 25.

Ventilation of the interior of the headlamp is effected by virtue of the provision of the air passages 26 and 28, as will now be described with reference to FIG. 2.

Air flows into the lamp body 10 via the air passage 26 and the air inlet portion 27, as indicated by an arrow A, and is divided into two air flows, one of which is directed, as indicated by an arrow B , toward the front side of the reflector 14 via a space or passage formed between the bottom *14d* of the reflector and the bottom of the lamp body 10, while the other air flow is directed, as indicated by an arrow $B_2$, toward the front side of the reflector 14 through a plurality of air passage ports *17a* formed through a disc-shaped socket-mounting metal member 17 mounted around the bulb socket 16. At a position forward of the reflector 14, the air stream indicated by the arrow B moves upward along the front lens 30, as indicated by an arrow $C_1$, and passes to the rear side of the reflector 14 through a space between the upper portion *14e* of the reflector 14 and the upper portion of the lamp body 10, as indicated by arrows D and $E_1$, and further moves exteriorly of the headlamp through the air passage 28, as indicated by an arrow F. On the other hand, air flowing into the reflector 14 as indicated by the arrow $B_2$ moves upward within the reflector 14 as indicated by an arrow $C_2$, and partially joins the air flow of the arrow C moving along the front lens 30, while the remainder reaches the open rear 20 of the lamp body 10 through s the air passage ports *17a* formed through the socket-mounting metal member 17, as indicated by an arrow $E_2$. Then, the air flow passes exteriorly of the headlamp through the air passage 28, as indicated by the arrow F. These air flows within the headlamp are caused by natural convection developed when air heated by the bulb 15 moves upwardly.

Undesirable substances which would result in fogging of the lens, such as water vapor as well as oil molecules emitted from the socket cover 22 heated to elevated temperatures, float within the headlamp. However, these undesirable substances are driven out of the headlamp by natural convection, thereby preventing such undesirable substances from depositing on the inner surface of the front lens 30.

Similar to the lamp body 10, the front lens 30 attached to the lamp body 10 is of a generally rectangular shape, and has a stepped portion 34 formed at the upper side edge portion thereof and projecting at the rear side of the lens 30, as best shown in FIGS. 2, 4 and 5. As shown in FIGS. 1 and 6, the stepped portion 34 extends along the upper edge of the front lens 30 and is upwardly inclined or slanted from the right side to the left side of the lens. More specifically, the width d of the stepped portion 34 formed at the upper side edge portion of the front lens 30 increases progressively in the right-hand direction (see FIG. 1), and the stepped portion 34 is curved in the vicinity of the right side wall 32*d* of the front lens 30 and merges at its right-hand end into the right side wall 32*d*.

The provision of the slanting stepped portion 34 at the upper side edge portion of the front lens 30 lends a novel appearance to the headlamp which has heretofore not been achieved with conventional headlamps. As shown in FIGS. 2, 4, 5 and 6, a slightly stepped portion 36 is also formed at the lower side edge portion of the front lens 30, this stepped portion 36 cooperating with the inclined stepped portion 34 at the upper side edge portion to provide a further novel appearance of the headlamp.

As a result of the provision of the stepped portions 34 and 36 at the upper and lower side edge portions, respectively, convex stepped portions 35 and 37 corresponding respectively to the stepped portions 34 and 36 are formed on the rear face or rear side of the front lens 30. The convex stepped portion 35 slantingly extends along the upper wall 32*a* and serves to guide the ascending stream of the air as indicated by an arrow $C_3$ (FIG. 1). As a result, there is produced a new air flow along the convex stepped portion 35, which air flow has not been possible in conventional headlamps. This new air flow decreases stagnant the region 35*a* defined by the convex stepped portion 35 and tending to stagnate the ascending stream of air (indicated by the arrow D in FIG. 2) along the front lens 30, promotes natural convection, and enhances the ventilation effect.

As shown in FIGS. 1 and 6, a projecting portion 38 is formed at the upper side wall 32*a* of the front lens 30. The projecting portion 38 projects slightly at the rear side of the front lens to form a convex portion 39 (FIG. 7) which serves to positively convert the streamlined flow of the air flowing along the smooth inner surface of the side wall to a turbulent flow to thereby reduce the stagnant region and to enhance natural convection.

The amount of projection of the convex stepped portion 37 on the lower side wall 32*b* is small, and in addition the inclination of a convex surface 37*a* is also slight. Therefore, the convex stepped portion 37 will not affect the air flow.

As shown in FIGS. 1, 4 and 5, metal clips 50 are attached to abutted portions 52 of the front lens 30 and the lamp body 10 to positively fasten them together. Two of the metal clips 50 are provided at the upper portion of the headlamp and disposed generally in registry with respective ones of the clips on the upper portion. Four pairs of opposed walls 54 are formed on an outer wall 12*a* of the seal groove 12 in perpendicular relation thereto, and each clip 50 is interposed between a respective pair of the opposed walls 54. Thus, each pair of opposed walls 54 prevents the clip 50 from becoming displaced out of position.

A light-shielding coating of a black color is applied to all side edge portions except for the left side edge portion 32*c*, that is, to the side edge portions 32*a*, 32*b* and 32*d*. This prevents scattering of the light leaking through a space formed between a bonnet 60 of the automobile and the stepped portion 34 of the front lens 30, as shown in FIG. 5. The black light-shielding coating may be replaced by a stepped portion formed on the rear side of the front lens 30 to scatter the light.

In addition to the front lens 30 having the inclined stepped portion 34, another front lens having a non-inclined stepped portion of uniform width at its upper side edge portion may be provided. In this case, the lamp body 10 and the reflector 14 are designed so that either the front lens 30 with the inclined stepped portion 34 or the front lens with the non-inclined stepped portion can be applied to the headlamp With this arrangement, the headlamp with the front lens having the inclined stepped portion may be used in a hatchback vehicle, while the headlamp with the front lens having the non-inclined stepped portion may be used in other types of automobiles.

The shape of headlamps varies slightly from one type of automobile to another according to their individual specifications, and the shapes of lamp bodies and reflectors conventionally had to vary with the shape of the headlamps. With this embodiment of the present invention, however, the lamp body 10 and the reflector 14 can be used commonly with front lenses of o different shapes. Therefore, the number of component parts can be reduced, and the production line can be simplified. This can markedly reduce the cost of the headlamp.

As described above, the rectangular automobile headlamp of the present invention has a novel appearance due to the stepped portion formed at the upper side edge portion of the front lens and extending along the upper edge thereof in inclined relation thereto.

The stepped portion projects from the rear side of the front lens and extends in inclined relation to the upper edge of the front lens. The inclined wall of the inclined stepped portion serves to guide the flow of air to make the flow of air within the headlamp more active, thereby preventing fogging of the headlamp.

Figure 7:
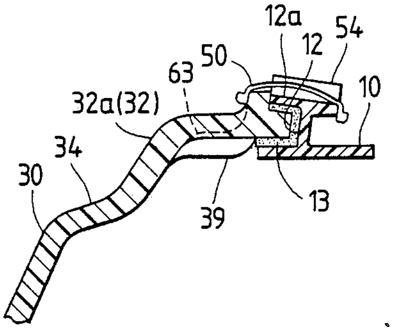
FIG. 7 is a cross-sectional view taken along a line VII—VII in FIG. 1.

As mentioned above, four metal clips 50 are attached to the above joint portion. Specifically, two of the clips 50 are provided on the upper portion of the headlamp, while the other two are provided on the lower portion of the headlamp in such a manner as to be disposed in registry with respective ones of the clips 50 on the upper portion, as shown in FIG. 7. Thus, the peripheral wall 32 of the front lens 30 is mechanically s fastened to the sealing groove 12 in the lamp body 10 by these clips. Due to the fastening by the clips in addition to the fastening by the sealing material 13, the peripheral wall 32 is more positively and firmly fastened to the sealing groove 12.

The upper side wall 32*a* of the front lens 30 is formed into a generally channel-shaped cross-section adjacent its clip-fastened portion to form a projecting portion 63 which extends in the direction of width of the upper side wall 32*a*.

The front lens 30 is made of a synthetic resin, and the light from the associated bulb is directed toward the front lens 30 so that the front lens 30 is heated to a higher temperature than the lamp body 10. As a result, there occurs a difference in thermal expansion between the lamp body 10 and the front lens 30. At the engaging portions of these two members where the peripheral wall 32 is fitted in the sealing groove 12, the sealing material 13 absorbs such difference of thermal expansion. However, at the fastened portions where the clips 50 are provided to fasten the front lens 30 and the lamp body 10 together, the two members are restrained from freely expanding and contracting. As a result, thermal strain develops in the front lens 30 in the vicinity of the clip-fastened portions. However, the peripheral wall 32 is liable to be deformed in the peripheral direction thereof at the projecting portion 63 formed in the vicinity of the clip-attaching portion, and therefore the projecting portion 63 is deformed to absorb the difference of thermal expansion to thereby restrain the occurrence of thermal strain and hence thermal stress. Therefore, there is not encountered the disadvantage that the front lens 30 is deformed.

In the above embodiment, although the mechanical fastening elements for fastening the front lens 10 and the lamp body 20 together are the clips 50, the invention is not restricted to clips. Fastening may be effected for example, by screws or by a double-hook type keeper arrangement.

Figure 8:
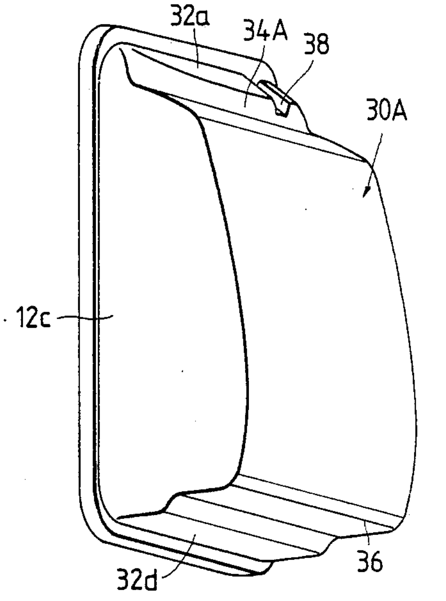
FIGS. 8 and 9 are perspective views of modified front lenses.
Figure 9:
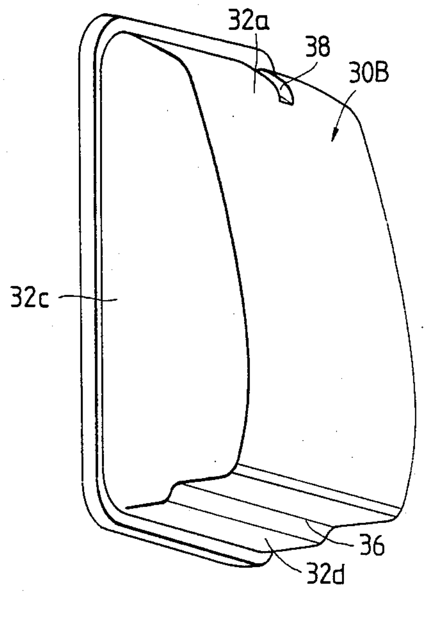
Figure 10:
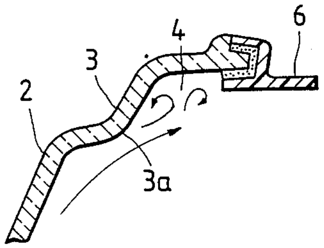
FIG. 10 PRIOR ART
FIG. 10 is a vertical cross-sectional view of an important portion of a conventional headlamp.

FIGS. 8 and 9 show modified front lens. The front lens 30A made a synthetic resin shown in FIG. 8 has a stepped portion 34A which has a uniform width and is not inclined relative to the upper side wall of the lens. The front lens 30B of a synthetic resin shown in FIG. 9 does not have a stepped portion at its upper side wall. Except for these points, these modified front lens are identical to the front lens of the above-described embodiments. Thus, corresponding parts are designated by the same reference numerals, and a further explanation thereof is omitted.

In the rectangular automobile headlamp according to the present invention, the front lens of a synthetic resin has the projecting portion for absorbing thermal strain which is provided in the vicinity of the portion of the front lens where it is mechanically fastened to the lamp body, the projecting portion projecting from the rear side of the side wall. With this construction, the projecting portion absorbs the thermal strain (thermal stress) developing in the front lens to thereby prevent deformation of the front lens.

With respect to the ventilation effect due to natural convection, the convex portion, which is defined by the projecting portion of the side wall of the front lens and projects from the rear side of the side wall, partially converts the streamlined flow of the air along the inner surface of the side wall of the front lens to thereby activate the air flow. This enhances the ventilation effect and also enhances the anti-fogging effect.

What is claimed is:

1. In a rectangular headlamp for an automobile having a rectangular front lens attached to a rectangular open front of a lamp body and the lamp body has air passage means for communicating the interior of said headlamp with the exterior thereof, the improvement wherein a stepped portion is formed at an upper side edge portion of a front face of said front lens projecting from a rear side of said front lens and spaced from a peripheral side edge portion of said lens between said front face and said lamp body, said stepped portion extending along an upper edge of said front lens in inclined relation to said upper edge.

2. The rectangular headlamp of claim 1, wherein said stepped portion is curved along at least one portion thereof.

3. The rectangular headlamp of claim 1, wherein a slightly stepped portion is formed at a lower side edge portion of said front lens.

4. The rectangular headlamp of claim 1, wherein a recessed portion is formed at an upper side wall of said lens projecting slightly at an outer side of said front lens to form a convex portion for converting a streamlined flow of air to a turbulent flow.

5. The rectangular headlamp of claim 1, wherein said front lens is made of a synthetic resin material, a sealing material is received in a sealing groove formed in a rectangular front peripheral edge of said lamp body, a peripheral side wall of a rectangular front lens made of a synthetic resin is engaged in said sealing groove, and mechanical fastening means fastens said lamp body and said side wall at suitable regions spaced in the direction of extension of said side wall, said side wall of said front lens being formed in a recessed shape in the vicinity of said mechanical fastening means to provide a projecting portion for absorbing thermal strain, said projecting portion projecting from an outer side of said side wall.

* * * * *